O. STODDARD.
Knob Attachment.
No. 222,096. Patented Nov. 25, 1879.
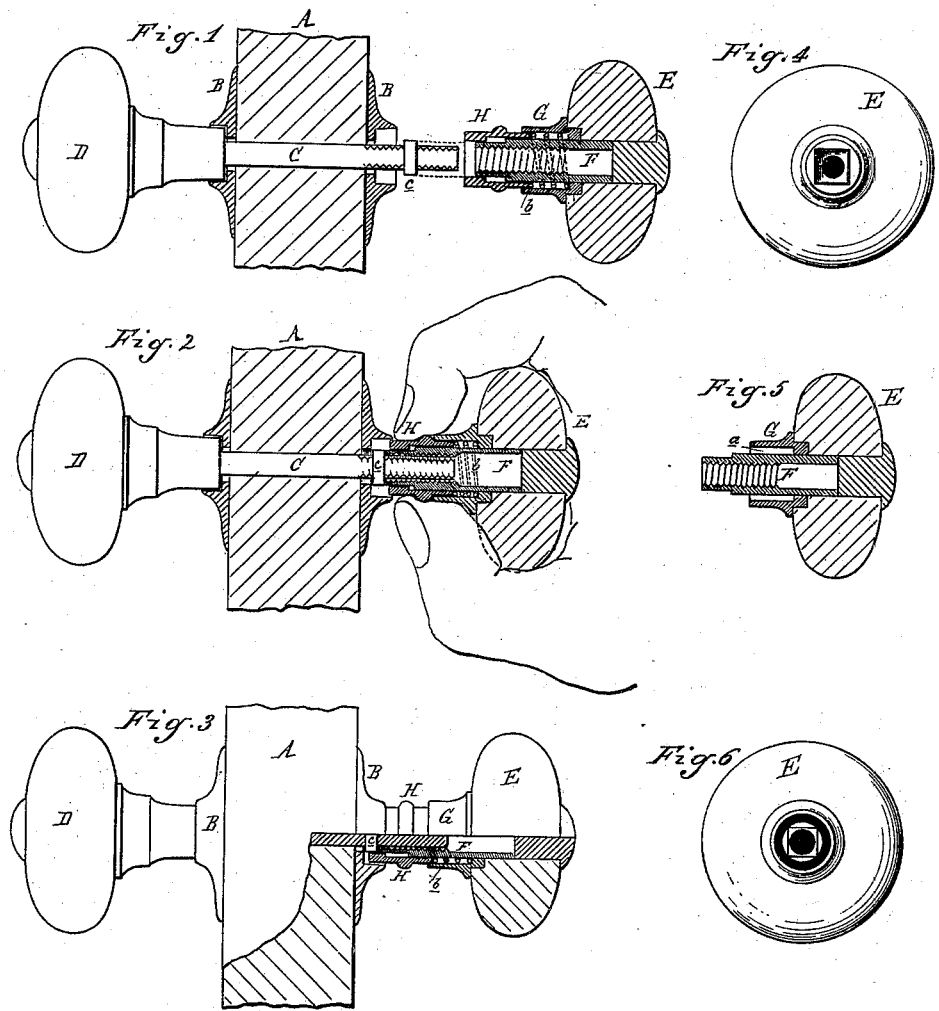

UNITED STATES PATENT OFFICE.

OSCAR STODDARD, OF ROCHESTER, NEW YORK, ASSIGNOR OF ONE-QUARTER OF HIS RIGHT TO CHARLES F. POTTER, OF DETROIT, MICHIGAN.

IMPROVEMENT IN KNOB ATTACHMENTS.

Specification forming part of Letters Patent No. 222,096, dated November 25, 1879; application filed September 2, 1879.

*To all whom it may concern:*

Be it known that I, OSCAR STODDARD, of Rochester, in the county of Monroe and State of New York, have invented an Improvement in Door-Knobs, of which the following is a specification.

The nature of this invention relates to new and useful improvements in the construction and application of door-knobs to spindles, whereby they can be adjusted to doors of different thickness.

The invention consists in the peculiar adaptation of a sliding sleeve moving in a recess in the shank of the knob, and locking with a washer on the spindle, substantially as more fully hereinafter set forth.

Figure 1 is a longitudinal vertical section. Fig. 2 is a similar view, showing manner of securing. Fig. 3 shows knob secured to place. Fig. 4 is an elevation of the inner end of the knob-shank and adjustable sleeve. Fig. 5 is a section of the same with the sleeve removed. Fig. 6 is an elevation of the inner end of the shank with the sleeve removed.

In the accompanying drawings, which form a part of this specification, A represents the section of a door, to the sides of which are secured the roses B, through which the spindle C passes, as in the ordinary manner, one end of the spindle having rigidly secured to it a knob, D. E is a knob, which is provided with a shank, F, around the base of which is secured a thimble, G, of greater diameter than the shank F, thus leaving an annular recess or chamber, a, around the shank, as is clearly shown in Fig. 5. The shank F is round about two-thirds of its length from its base, while the outer end is squared, as shown in Figs. 4 and 6, and the shank is internally threaded, so as to screw upon the threaded end of the spindle C. H is a sleeve, the opening through which is square at one end and round at the other, so as to slide upon the similarly-formed portion of the shank F. The inner end of this sleeve, when in place, is inclosed within the recess a, within which is also placed a suitable spring, b, which latter, when the knob has been screwed on, forces the sleeve forward, compelling its squared opening to embrace the square washer c, which slides loosely on the spindle, thus locking the parts together, so that the knob cannot be turned off the spindle until the sleeve has been retracted.

If desired, the sleeve H may be constructed in two parts, and the inner part may be threaded upon the circular portion of the shank F, so that such part can be screwed forward instead of being forced forward by the spring.

What I claim as my invention is—

1. A door-knob provided with a recessed shank, in combination with a sleeve, H, spindle C, and washer c, substantially as described.

2. An adjustable door-knob provided with a recessed shank, F, and sleeve H, in combination with a spring, b, spindle C, and washer c, substantially as and for the purposes specified.

In testimony that I claim the above I hereunto set my hand this 11th day of June, 1879.

OSCAR STODDARD.

Witnesses:
H. S. SPRAGUE,
A. BARTHEL.